Fig. 4

United States Patent Office 2,974,272
Patented Mar. 7, 1961

2,974,272

VOLTAGE REGULATING SYSTEM

Katsuhiko Noda and Kazuo Kurokawa, Shinjuku-ku, Tokyo-to, Japan, assignors to Agency of Industrial Science and Technology, Ministry of International Trade and Industry, Chuo-ku, Tokyo-to, Japan, an authority of the Japanese Government Filed Apr. 21, 1958, Ser. No. 729,708

Claims priority, application Japan July 2, 1957

6 Claims. (Cl. 323—89)

The present invention relates to automatic control systems and more particularly to a sub-system for compensating control performance of any automatic control system by a compensator having suitable time lag components and acting as a differentiator or integrator.

In the usual pneumatic, hydraulic or electrical process controller, the control actions such as proportion (P), integral (I) and derivative action (D) are not only affected by dead zones, hysteresis and backlashes, but also lack stability and reliability, because of the movable element therein.

Furthermore, due to mutual interferences between the above mentioned various control actions, perfect performance of combined control actions such as $(P+I)$ or $(P+I+D)$ action cannot be expected.

The recently developed electronic controller has no such defects, but it is relatively delicate and somewhat inflexible.

The conventional anti-hunting device of a control system, used to improve performance, has a transfer function $$\frac{K_p}{1+T_p}$$

where, T, K and $p$ represent time constant, gain constant and $$\frac{d}{dt}$$

respectively.

The typical embodiments of the above-mentioned transfer function are a so-called anti-hunting transformer and a CR circuit. The former has the defects that it is too large in size and its time constant T and gain constant K cannot be adjusted continuously and independently.

On the other hand, the CR circuit has the defect that its time constant and gain cannot be independently adjusted.

Furthermore, since a condenser having a large capacity, more than 1000 µf., is necessary in order to get the required time constant, an electrolytic condenser which is inferior in reliability must be used.

An object of the present invention is to provide a simple and stable system which can compensate, with high accuracy, the performance of any control system.

Another object of the present invention is to provide a system capable of obtaining a compensator free of movable elements and thereby eliminating the inherent defects due to movable elements in automatic control and regulation systems.

Another object of the present invention is to provide a system capable of providing a control device, for example a process control device in which the control actions are free of mutual interference.

Still another object of the present invention is to provide a durable anti-hunting device, comprising two time lag components, in which the response time and gain constant of the device are continuously and independently adjustable over a wide operation range.

The aforementioned objects have been attained by an anti-hunt compensating sub-system for automatically compensating performance of an automatic control system having an automatic device providing a control output for maintaining an ideal value on a controlled variable in a controlled system deviating for periods of time in performing its control function so that the output thereof does not correspond to the ideal value which comprises a compensator composed of two parallel time lag components, with the input and output of said compensator being connected to the control system so that a compensating signal may be fed into the input side of the compensator, and the output of the compensator may be applied to a suitable position of the control system so as to obtain a desirable performance of the control system. The two time log elements are connected in a loop and have the same amplification characteristic over their operating range. One of the elements has a log constant greater than the other and the time log constants of both elements are so chosen as to be less than the period of variation of the automatic device of the control system.

The novel features which we believe to be characteristics of our invention are set forth with particularity in the appended claims. Our invention itself, however, both as to its principle and manner of operation together with further objects and advantages thereof, may best be understood by reference to the following description taken in connection with the accompanying drawings, in which the same elements are indicated by the same numerals and characters and in which:

Fig. 4 is a schematic diagram of an embodiment of an integrator according to the present invention, in which magnetic amplifiers are used.

*Differentiator*

Figure 1:
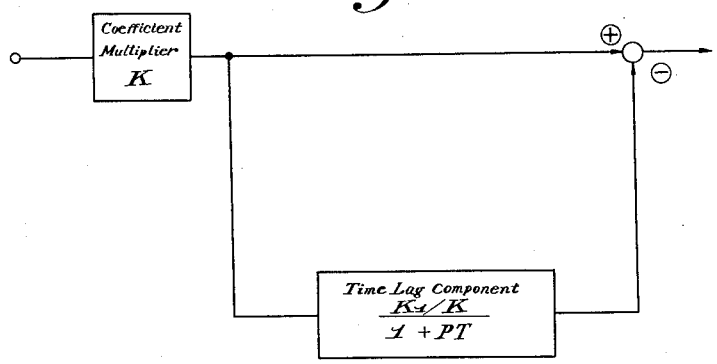
Fig. 1 is a typical block diagram illustrating the typical principle of a known differentiator for obtaining a transfer function.

In order to obtain a transfer function of an anti-hunting device by linear components having a time lag character, it is usual to use a system such as shown by a block diagram in Fig. 1, in which the input signal of a coefficient multiplier is applied to a time lag component as shown and the transfer function is obtained by subtracting the output signal of the component from the input signal thereof. In Fig. 1, the principle for obtaining a transfer function of an anti-hunting device is represented by the following equation $$K\left(1 - \frac{\frac{K_1}{K}}{1+Tp}\right) = K\frac{\left(1 - \frac{K_1}{K} + Tp\right)}{1+Tp}$$

where $K$ and $K_1$, $T$, and $p$ represent gain constants, time constant of the time lag component, and $$\frac{d}{dt}$$

respectively.

In the above equation, if $$\frac{K_1}{K}$$

is selected to be equal to 1, the transfer function of the system becomes $$\left(\frac{KTp}{1+Tp}\right)$$

This is the transfer function of an ordinary anti-hunting device.

Figure 2:
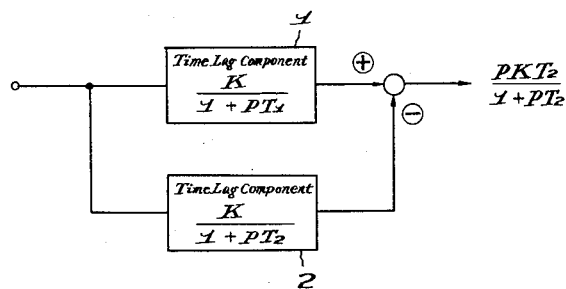
Fig. 2 is a block diagram showing the typical principle of the differentiator consisting of time lag components according to the present invention.

However, in the conventional time lag component, the gain varies in accordance with the variation of the amplitude of the input signals, temperature and the other variables. It is, therefore, practically impossible to keep the gain constant of the time lag component $$\frac{K_1}{K}$$

at a value equal to 1 over the entire operating range, whereby an attempt to obtain the transfer function of anti-hunting device fails. These disadvantages can be eliminated by a compensation and anti-hunt system according to the present invention as shown in Fig. 2, in which two time lag components 1 and 2 having the same gain constant are connected in parallel in a loop so that the difference between the separate outputs of the components may be led out as the output of said subsystem as a compensating signal.

For convenience, in the following illustrations, it is assumed that the time lag components are linear time lag components of a 1st order. When the transfer functions of the components 1 and 2 are selected so as to be equal to $$\frac{K}{1+pT_1}$$

and $$\frac{K}{1+pT_2}$$

respectively, and the time constant $T_2$ is selected so as to be sufficiently larger than the time constant $T_1$, the transfer function of the system becomes equal to $$\frac{KT_2p}{1+pT_2}$$

Figure 3:
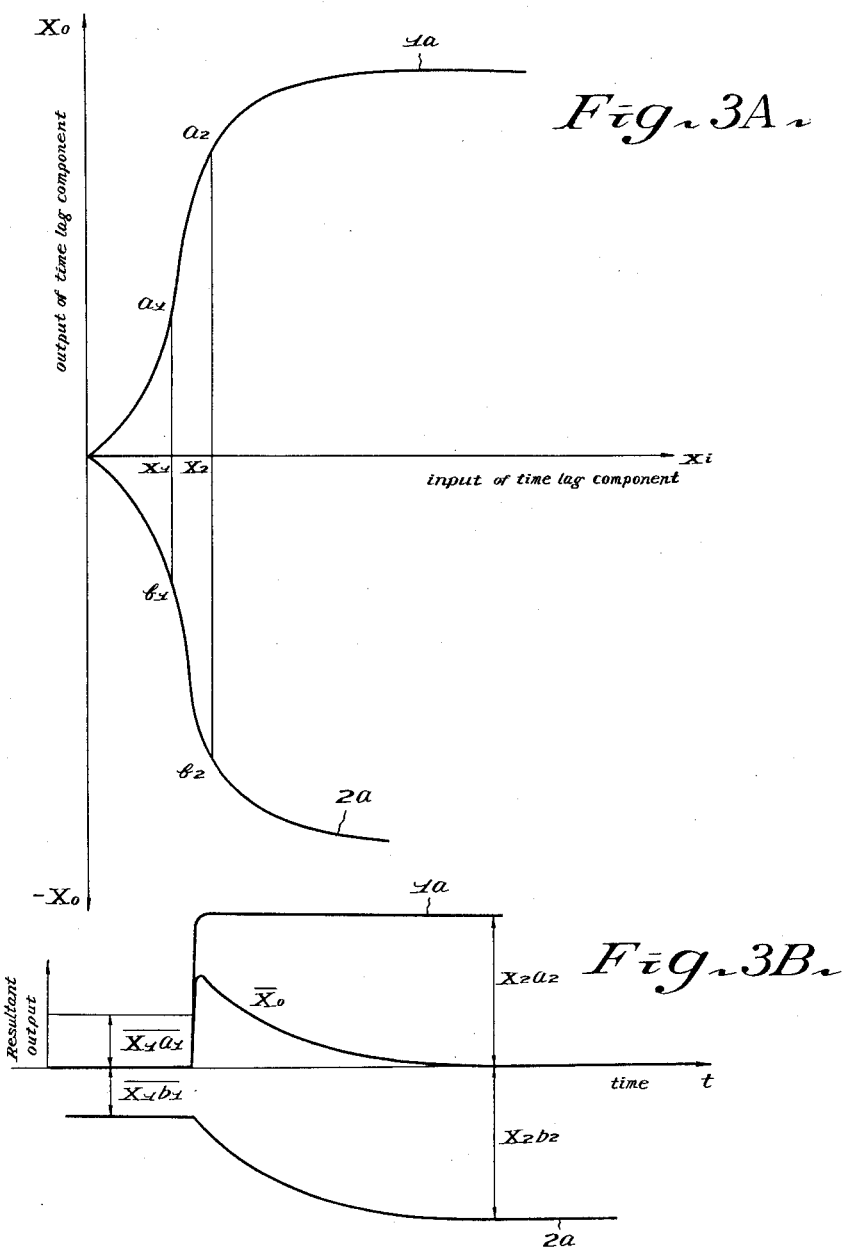
Fig. 3A is a diagram illustrating the characteristic curves showing the relations between output and input of the time lag components of the device in Fig. 2.
Fig. 3B is a diagram showing a characteristic curve of the resultant output of the device in Fig. 2.

This relation is shown in Figs. 3A and 3B, in which the characteristic curves of the time lag components 1 and 2 having the same input and output characters are, respectively, represented by the curves $1a$ and $2a$, and let it be assumed that the time constant $T_1$ of the component 1 is selected so as to be sufficiently smaller than the time constant $T_2$ of the component 2 and the input signal of said system is $\overline{X_1}$. In such a case, the output $\overline{X_1a_1}$ of the component 1 is equal to the output $\overline{X_1b_1}$ of the component 2, so that the resultant output of said system is zero under any stationary state. If the input of the system varies instantaneously from $X_1$ to $X_2$ the output of the component 1 rapidly becomes $\overline{X_2a_2}$, but the ouput of the component 2 becomes $\overline{X_2b_2}$ with a time lag. This stage is shown in Fig. 3B in which the resultant output of the system is represented by $\overline{X_0}$, because the output of said system is given by the difference between the outputs $\overline{X_2a_2}$ and $\overline{X_2b_2}$ of the time lag components. While the gains of both the time lag components 1 and 2 vary in accordance with the variation of the operating points, as described above, it is easy to make the gains of both the time lag components substantially equal to each other over the wide operation range. Therefore, the transfer function of the anti-hunting device can be realized practically by such system as has already been shown by investigation.

Since there are many kinds of time lag components whose lagging times and the gain constants can be continuously and independently adjusted, an anti-hunting device of the present invention, in which the response time and gain constant of the device are continuously and independently adjustable over a wide range, is obtained by means of various kinds of the time lag components.

Furthermore, if the value K is so selected that the time constant $T_2$ and the value $KT_2$ become, respectively, smaller and larger in comparison with the varying period of the input signal, then the output of said system can be made approximately equal to $KT_2p$, whereby differential operation can be achieved.

Figure 4:
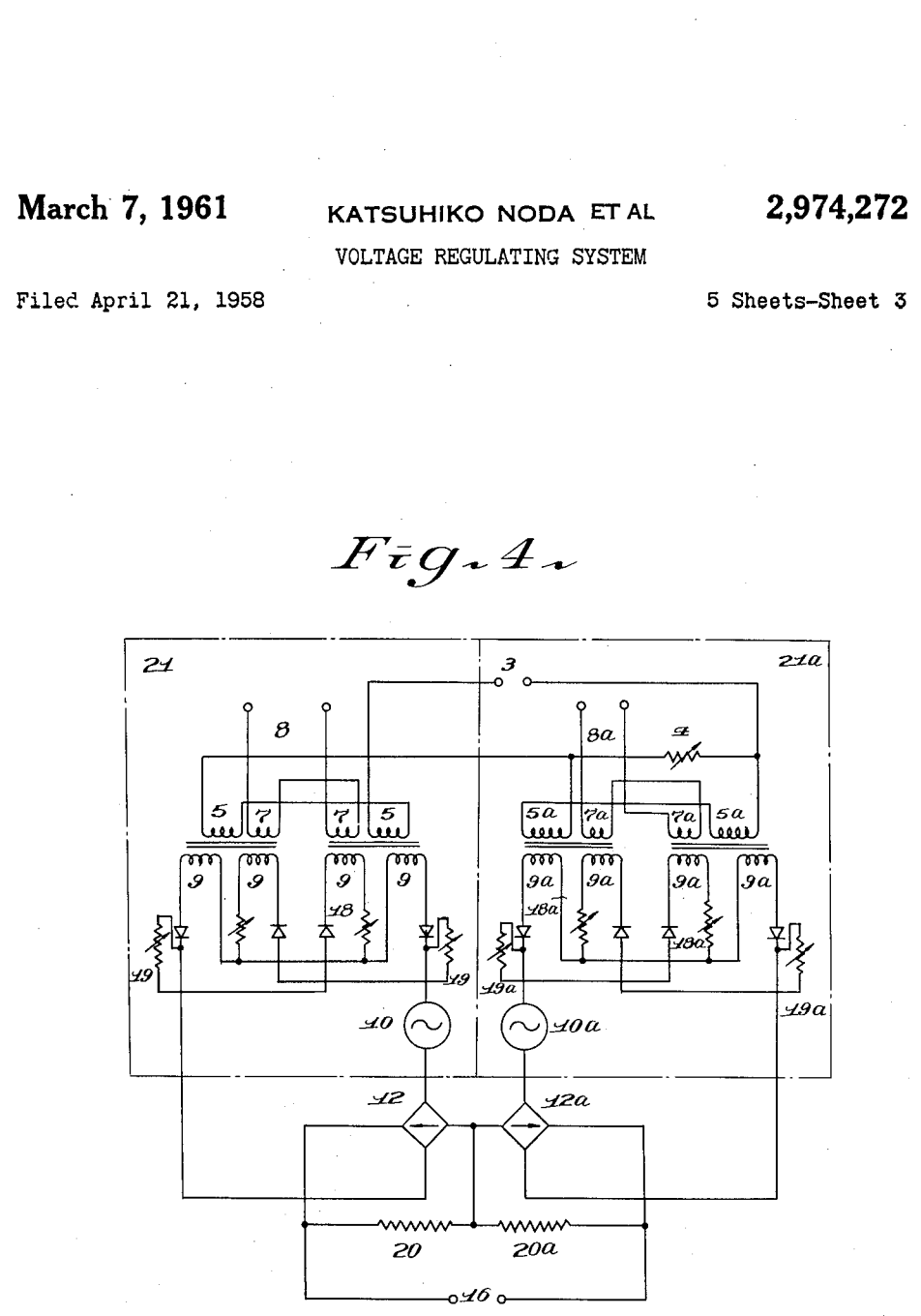

The device in Fig. 4 relates to one embodiment of the present invention, in which two magnetic amplifiers 21 and 21a are connected so as to subtract the two outputs of the amplifiers by a resistance. The device comprises input terminals 3, output terminals 16 connected to two magnetic amplifiers 21 and 21a having control windings 5 and 5a, rectifiers 12 and 12a connected to respective alternating current sources 10 and 10a, bias windings 7 and 7a, input terminals 8 and 8a for the bias windings and output windings 9 and 9a connected to the alternating current sources 10, 10a. In the device, the number of turns of the control winding 5a is selected so as to be sufficiently larger than that of the control winding 5 to make the response time of the magnetic amplifier 21a sufficiently larger than that of the magnetic amplifier 21, and the gain of the amplifier 21a is controlled by a gain adjuster 4 so as to be equal to that of the amplifier 21. The outputs of both amplifiers 21 and 21a are applied to the subtracting resistances 20 and 20a, and the difference can be led out as the resultant output of the device. The response time and the gain of the magnetic amplifiers 21 and 21a can be adjusted by the variable resistors 18, 18a, 19 and 19a.

In the embodiment of the device in Fig. 4, the zero point of the output is liable to be varied in accordance with the variation of the operating point of the device, because it is difficult to make the amplification characters of both of the magnetic amplifiers 21 and 21a match over a very wide operation range. Such a defect, however, can be eliminated by the negative feedback of a part of the output of the device to the feedback winding of either one of both magnetic amplifiers. If this feedback is positive, the response time can be increased.

*Integrator*

Figure 5:
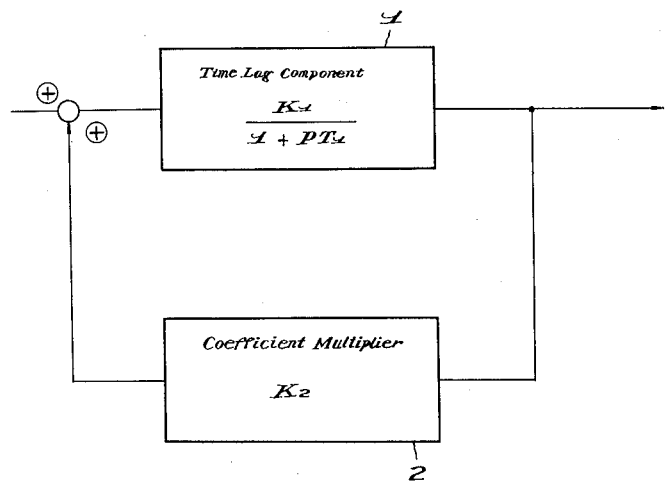
Fig. 5 is a block diagram showing the typical principle of the well-known integrator consisting of two lagging and multiplying components having linear characteristics.

In the well-known system of performing integral functions by means of such a time lag component 1 having a gain constant $K_1$ as shown in Fig. 5, the output of the time lag component 1 is positively fed back to the input side of the component through a coefficient multiplier 2 whose multiplication factor is $K_2$, the values of $K_1$ and $K_2$ must be so selected that the loop gain $K_1K_2$ becomes unity. And in this system, the gain constant $K_1$ is not constant in the conventional time lag component and ordinarily varied somewhat in accordance with the amplitude of the input signal. That is to say, the transfer function $G(p)$ becomes as follows;

$$G(p) = \frac{K_1}{1-K_1K_2} \cdot \frac{1}{1+p\frac{T_1}{1-K_1K_2}} \quad (1)$$

Figure 6:
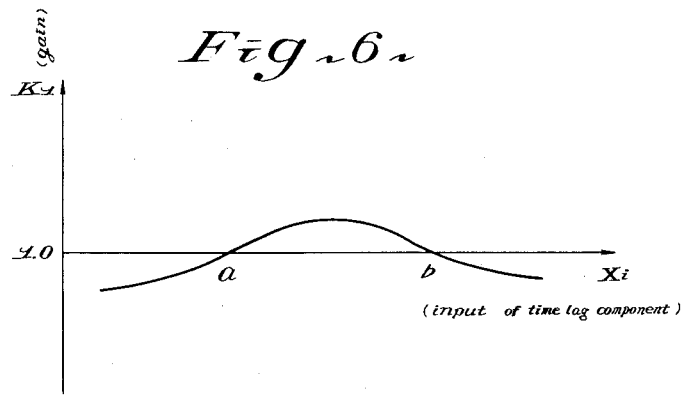
Fig. 6 is a diagram of a curve illustrating the gain character of the time lag component of the device in Fig. 5.

Therefore, if it be assumed that the time lag component being used has such gain characteristic as shown in Fig. 6 and that the gain of the component 2 is unity over the whole operation range considered, the loop gain $K_1K_2$ varies as follows:

(a) When the input $Xi$ of the time lag component is in the range ($Xi<a$ or $Xi>b$), it follows that $$K_1K_2<1$$

Accordingly, the function $G(p)$ represents the time lag characteristic.

(b) When the input $Xi$ of the time lag component is in the range ($a<Xi<b$), it follows that $$K_1K_2>1$$

In this case, the function $G(p)$ becomes unstable and represents jump character.

As the result, the system in Fig. 5 performs as the time lag component having a time constant $$\frac{T_1}{1-K_1K_2}$$

for the case $Xi<a$.

For this input range of the time lag component 1, the system performs as an approximate integrator so far as the parameter $p$ satisfies the following restriction.

$$p\frac{T_1}{1-K_1K_2}>1 \quad (2)$$

On the other hand, when the input $Xi$ of the time lag component 1 becomes larger than $a$, the system in Fig. 5 represents a jump character. In accordance with the above reason, said system cannot be used as an approximate integrator in the range $Xi>a$.

Next, if the gain $K_2$ is so selected that it is below 1, the value $(1-K_1K_2)$ becomes larger than the former case, whereby the lowest allowable value of $p$ which satisfies the restriction (2) becomes larger than the former case. This means that the lowest frequency for the system which performs as the integrator with the same accuracy becomes higher than the former case. This disadvantage can be eliminated by the present invention.

Figure 7:
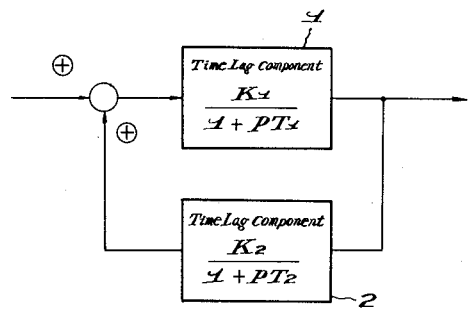
Fig. 7 is a block diagram showing the principle of the integrator consisting of two time lag components according to the present invention.

In Fig. 7, showing the principle of the present invention, two of the time lag components 1 and 2 are connected in parallel in a loop, and the output of the component 1 is positively fed back to the input component 1 through the time lag component 2.

The gain constants of the two components are adjusted so that the loop gain of said system may become approximately equal to unity, and the time lag of the component 2 is selected to maintain the stability of said system. For convenience, in the following illustration, all time lag components are assumed to be linear time lag components of a 1st order.

In this system, when the response time $T_1$ is sufficiently larger than the response time $T_2$, the transfer function of said system becomes $$\frac{K_1}{pT_1}$$

whereby an integral characteristic can be obtained.

In Fig. 7, the transfer function $G(p)$ of said system is calculated by the following equation under the assumptions that the time lag component 1 has such a characteristic as is shown in Fig. 6 and that the time lag component 2 has a substantially linear characteristic over the operation range $$G(p) = \frac{\frac{K_1}{1+pT_1}}{1-\frac{K_1}{1+pT_1}\frac{K_2}{1+pT_2}}$$

$$= \frac{K_1}{T_1T_2} \cdot \frac{1+pT_2}{p^2+\frac{T_1+T_2}{T_1T_2}p+\frac{1-K_1K_2}{T_1T_2}} \quad (3)$$

The characteristic roots $\rho_1$ and $\rho_2$ of the Equation 3 are represented as follows:

$$\rho_1,\rho_2 = -\frac{T_1+T_2}{2T_1T_2} \pm \frac{1}{2}\sqrt{\left(\frac{T_1+T_2}{T_1T_2}\right)^2 - 4\frac{1-K_1K_2}{T_1T_2}} \quad (4)$$

Accordingly, if $(1-K_1K_2)<0$, one of said roots becomes positive, and so the system becomes unstable as is the case of the system in Fig. 5. Therefore, even in the system in Fig. 7, the starting point of the component 1 should not be positioned within the range ($a<Xi<b$), and said point should be selected at the range $[(1-K_1K_2)>0]$.

In the case when $$T_1 \gg T_2 \quad (5)$$

the following relation is obtained.

$$\frac{T_1+T_2}{T_1T_2} \simeq \frac{1}{T_2} \quad (6)$$

As a result of the selection of the loop $K_1K_2 \doteqdot 1$, there are some values of $p$ which satisfy the following condition.

$$(T_1+T_2)p \gg |1-K_1K_2| \quad (7)$$

or $$p \gg \frac{|1-K_1K_2|}{T_1+T_2} \quad (8)$$

Then, the Equation 3 becomes as follows.

$$G(p) \doteqdot \frac{K_1}{T_1T_2} \cdot \frac{1+pT_2}{p\left(p+\frac{T_1+T_2}{T_1T_2}\right)} \simeq \frac{K_1}{T_1T_2} \cdot \frac{1+pT_2}{p\left(p+\frac{1}{T_2}\right)}$$

$$\simeq \frac{K_1}{T_1} \cdot \frac{1+pT_2}{p(1+pT_2)} = \frac{K_1}{pT_1} \quad (9)$$

Then the integral performance is obtained. It should be noted that although the Equation 7 concerns only the absolute value of $(1-K_1K_2)$, an approximate integral performance can be attained even for the case when $(1-K_1K_2)<0$, notwithstanding the fact that in this case the system shown in Fig. 5 represents a jumping character.

Figure 8:
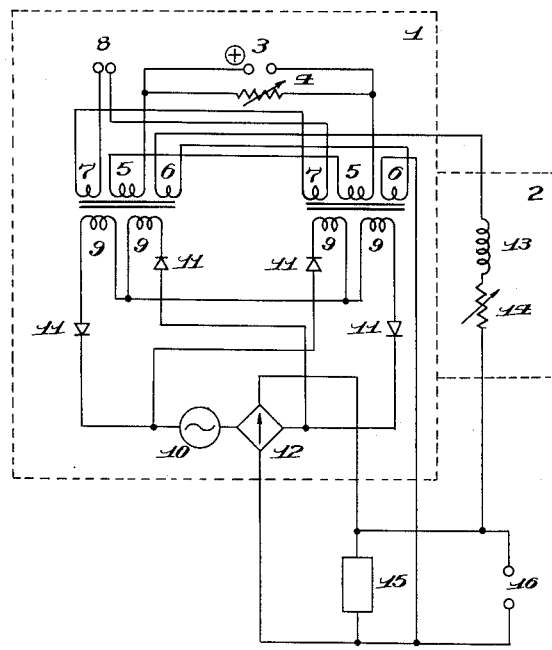
Fig. 8 is a schematic diagram of another embodiment of the present invention, in which a magnetic amplifier is used.

Fig. 8 shows an integrator which is one of the embodiments of the present invention, in which a magnetic amplifier is used and the feedback is effected by an inductance. This integrator comprises a main time lag component 1 formed by a magnetic amplifier, a time lag component 2 for feedback, input terminals 3, variable resistors 4 and 14 which can adjust the gain and integration time constant of the system, respectively, feedback windings 6, control windings 5, bias windings 7, bias input terminals 8, output windings 9, an alternating current source 10, feedback rectifiers 11, an output rectifier 12, a feedback inductance 13, a load 15, and output terminals 16.

In the integrator shown in Fig. 8, an integral value of the input signal can be led out from the output terminal 16 by selecting the response time of the component 1 so as to be larger than the response time of the feedback element 2 and by adjusting the gains of both the elements 1 and 2 by the resistors 4 and 14 so that the loop gain may be nearly equal to 1. The bias windings 7 are used for determining the starting point. By the adjustment of the bias current, it is possible to adjust the loop gain.

In such a manner as described above, the integrator shown in Fig. 8 can attain an integral operation.

By addition to the outputs of the above-mentioned differentiator and integrator and the output of a suitable amplifying device, a controller which does not contain the defect of mutual interference between the control functions can be made. In this case, any coefficient of the controller can be easily determined by adjusting the time lags and gains of the time lag components independently.

While we have described particular embodiments of our invention, it will, of course, be understood that we do not wish our invention to be limited thereto, since many modifications may be made and we, therefore, contemplate by the appended claims to cover all such modifications as fall within the true spirit and scope of our invention.

We claim:

1. In an automatic control system having an automatic device having a control output for maintaining an ideal value on a controlled variable in a controlled system deviating for periods of time in performing its control function so that the output thereof does not correspond to the ideal value, a compensation and anti-hunt compensating sub-system for automatically compensating for the variation in the output of said device during the variation periods comprising, means responsive to the output of the control device to derive an output compensating signal for compensating for said periods of variation, means connected to continuously apply the output of said control device to said last mentioned means as an input, means to apply said compensating signal at a given point in the controlled system, said means to derive the compensating signal comprising two time-lag elements connected in parallel in a loop with a common output and having the same amplification characteristic over their operating range, one of said elements having a lag constant greater than the other, both elements having time-lag constants so chosen as to be less than a variation period of the automatic device.

2. In an automatic control system having an automatic device having a control output for maintaining an ideal value on a controlled variable in a controlled system deviating for periods of time in performing its control function so that the output thereof does not correspond to the ideal value, a compensation and anti-hunt compensating sub-system for automatically compensating for the variation in the output of said device during the variation periods comprising, means responsive to the output of the control device to derive an output compensating signal for compensating for said periods of variation, means connected to continuously apply the output of said control device to said last mentioned means as an input, means to apply said compensating signal at a given point in the controlled system, said means to derive the compensating signal comprising two time-lag elements connected in parallel in a loop with each element providing a separate output and having the same amplification characteristic over their operating range, one of said elements having a lag constant greater than the other, both elements having time-lag constants so chosen as to be less than a variation period of the automatic device, means differentially connecting output sides of the two elements to cause the compensating signal to correspond to a signal representative of the difference between the two outputs of the time-lag elements.

3. In an automatic control system having an automatic device providing a control output signal for maintaining an ideal value on a controlled variable in a controlled system and deviating for periods of time in performing its control function so that the output thereof does not correspond to the ideal value during those periods, a feed-back compensating sub-system for automatically compensating for the variation in output of said device during the variation periods comprising, means connected to continuously apply the output of said control device as an input to said compensating feed-back loop, said loop comprising solely a first time-lag element connected in series with said means applying the loop input, a second time-lag element connected in a feed-back loop with said first time-lag element and connected to receive the output of the first time-lag element, the time-lag elements having gain characteristics so chosen that the product of said gains is substantially equal to unity, and means connected in series with the first time-lag element to apply a feed-back loop output as a compensated control signal to the controlled system.

4. In an automatic control system having an automatic device providing a control output signal for maintaining an ideal value on a controlled variable in a controlled system and deviating for periods of time in performing its control function so that the output thereof does not correspond to the ideal value during those periods, a feed-back compensating sub-system for automatically compensating for the variation in output of said device during the variation periods comprising, means connected to continuously apply the output of said control device as an input to said compensating feed-back loop, said loop comprising solely a first time-lag element connected in series with said means applying the loop input, a second time-lag element connected in a feed-back loop with said first time-lag element and connected to receive the output of the first time-lag element, the time-lag elements having gain characteristics so chosen that the product of said gains is slightly less than unity, and means connected in series with the first time-lag element to receive a feed-back loop output to the controlled system comprising a jumping device having jump points so selected that operation of the controlled variable is possible with some time lags subsequent to application thereto of the compensating loop output.

5. In an automatic control system having an automatic device providing a control output signal for maintaining an ideal value on a controlled variable in a controlled system and deviating for periods of time in performing its control function so that the output thereof does not correspond to the ideal value during those periods, a feed-back compensating sub-system for automatically compensating for the variation in output of said device during the variation periods comprising, means connected to continuously apply the output of said control device as an input to said compensating feed-back loop, said loop comprising solely a first time-lag element connected in series with means applying the loop input, a second time-lag element connected in a feed-back with said first time-lag element, the time-lag elements having gain characteristics so chosen that the product of said gains is substantially equal to unity, means connected in series with the first time-lag element to apply a feed-back loop output as a compensated control signal to the controlled system; and each of said time-lag elements is a network comprising a magnetic amplifier, a transistor, an electronic device and an R-L-C circuit electrically connected.

6. In an automatic control system having an automatic device having a control output for maintaining an ideal value on a controlled variable in a controlled system deviating for periods of time in performing its control function so that the output thereof does not correspond to the ideal value, a compensation and anti-hunt feed-back compensating sub-system for automatically compensating for the variation in the output of said device during the variation periods comprising, means responsive to the output of the control device to derive an output compensating signal for compensating for said periods of variation, means connected to continuously apply the output of said control device to said last mentioned means as an input, means to apply said compensating signal at a given point in the controlled system, said means to derive the compensating signal comprising two time-lag elements connected in parallel in a loop with different outputs and having the same amplification characteristic over their operating range, one of said elements having a lag constant greater than the other, both elements having time-lag constants so chosen as to be less than a variation period of the automatic device, means differentially connecting output sides of the two elements to cause the compensating signal to correspond to a signal representative of the difference between the two outputs of the time-lag elements.

References Cited in the file of this patent

UNITED STATES PATENTS

| | | |
|---|---|---|
| 2,084,135 | Ford | June 15, 1937 |
| 2,138,732 | Craig | Nov. 29, 1938 |
| 2,193,966 | Jones | Mar. 19, 1940 |
| 2,387,652 | Dickieson | Oct. 23, 1945 |
| 2,797,340 | Bennett | June 25, 1957 |